US006219326B1

(12) United States Patent
Yamashita et al.

(10) Patent No.: US 6,219,326 B1
(45) Date of Patent: Apr. 17, 2001

(54) OPTICAL PICKUP FEED DEVICE

(75) Inventors: Toshirou Yamashita; Akira Shimizu; Shigeharu Furusawa; Jiro Morinaga; Taichi Sato; Yasuhiro Shinkai, all of Saitama-ken (JP)

(73) Assignee: Pioneer Electronic Corporation, Tokyo (JP)

(*) Notice: Subject to any disclaimer, the term of this patent is extended or adjusted under 35 U.S.C. 154(b) by 0 days.

(21) Appl. No.: 09/143,362

(22) Filed: Aug. 28, 1998

(30) Foreign Application Priority Data

Sep. 2, 1997 (JP) .................................................. 9-252862

(51) Int. Cl.[7] .................................................. G11B 21/02
(52) U.S. Cl. .................................................. 369/223
(58) Field of Search .................................. 369/223, 219, 369/215, 244, 249; 411/88, 195, 919

(56) References Cited

U.S. PATENT DOCUMENTS 6,046,974 * 4/2000 Uehara ................................ 369/219
6,052,358 * 4/2000 Morikawa et al. .................. 369/219
6,058,098 * 5/2000 Kato .................................... 369/219
6,081,500 * 6/2000 Seino .................................. 369/215

* cited by examiner

*Primary Examiner*—David L. Ometz
*Assistant Examiner*—Franklin D. Altman
(74) *Attorney, Agent, or Firm*—Arent Fox Kintner Plotkin & Kahn, PLLC

(57) ABSTRACT

An optical pickup feed device for feeding an optical pickup in a radial direction of an optical disc, includes guide rods enabling the optical pickup to move in a predetermined radial direction of an optical disc, and a driving system for producing a driving force to the optical pickup. The driving system comprises: a feed screw arranged in parallel with a direction in which the optical pickup moves, and is rotatable by a driving force from a driving motor; a nut engaging on the feed screw for moving the optical pickup, said nut including an engaging portion engageable with the feed screw and a bank portion provided on either side of the engaging portion, said bank portion being protruding toward the feed screw.

5 Claims, 5 Drawing Sheets

OPTICAL PICKUP FEED DEVICE

BACKGROUND OF THE INVENTION

The present invention relates to a feed device, particularly to an optical pickup feed device for use in a disc-type recording medium reproducing apparatus.

In a conventional reproducing apparatus for reproducing a disc-type recording medium such as a compact disc or a CD-ROM, an optical disc is rotated while an optical pickup is sent properly in a radial direction of the disc by virtue of a pickup feed device, so that the optical pickup may trace along an information track on the disc and irradiate a laser beam toward the track, thereby reading out the information recorded on the disc in terms of a reflection light reflected from the disc.

FIG. 4 illustrates a conventional optical pickup feed device for use in the above described recording medium reproducing apparatus. As shown in FIG. 4, the feed device comprises a driving motor 104, a feed screw 101, a nut 103 fixed in a rack 106 which is integrally connected with an optical pickup 102. The nut 103 is engaged on the feed screw 101. The feed screw 101 may be rotated by a driving force from the driving motor 104, so that the nut 103 is caused to move along the feed screw 101, thereby rendering the rack 106 and the optical pickup 102 to move integrally and linearly along guide rods 105.

In use of the above optical pickup feed device, to quickly search for a desired information recorded on an optical disc, it is necessary for a driving motor to rotate slightly in a clockwise direction and a counterclockwise direction, so as to cause the optical pickup 102 to move reciprocatingly in a radial direction of the disc. For this reason, it is required that a tooth pitch of the feed screw 101 be made large so as to render the nut 103 to move back and forth in a large pitch. Further, it is required that the number of teeth of the nut 103 be made fewer and that an inclining angle of each tooth of the feed screw 101 be made different from that of each tooth of the nut 103, so as to reduce a contact area between the teeth of the two members. In this way, it is sure for the optical pickup 102 to move easily and smoothly with only a reduced load.

However, a reduced contact area between the teeth of the feed screw 101 and those of the nut 103 will cause a reduction in a stability which is necessary for the nut 103 to move along the feed screw 101, resulting in an inclination of the nut 103 on the feed screw 101 when the optical pickup 102 is being moved. If the nut 103 is often inclined on the feed screw 101 due to a vibration from the outside of the device, it will be difficult for the optical pickup 102 to move in a stabilized manner.

FIGS. 5A and 5B are sectional views in side elevation illustrating engagements between the feed screw 101 and the nut 103. In more detail, FIG. 5A indicates an engagement between the feed screw 101 and the nut 103 when both of them are in a stationary condition, whilst FIG. 5B indicates an engagement between the feed screw 101 and the nut 103 when both of them are in motion (i.e., when the feed screw 101 is rotated about a central axis X in a clockwise or counterclockwise direction, driven by the motor 104 at a high speed).

As shown in FIG. 5A, when the feed screw 101 is stopped, the nut 103 will get engaged properly on the feed screw 101. On the other hand, as shown in FIG. 5B, when the feed screw 101 is rotated at a high speed by a driving force from the driving motor 104, since the teeth of the feed screw 101 will proceed at a high speed in a direction shown by an arrow in the drawing, at each time point there will be at least one tooth of the feed screw 101 whose top portion P gets strong bump into a base wall portion of a tooth of the nut 103. As a result, the nut 103 tends to rotate about the top portion P in a plane parallel with the paper surface of FIG. 5A.

Moreover, the nut 103 will get inclined gradually and an edge portion thereof will bump into an inclined portion Q of a tooth of the feed screw 101. As a result, the nut 103 is changed greatly from a position of FIG. 5A to a position of FIG. 5B, causing an inclination of the rack 106 and hence making it impossible to move the optical pickup 102 in a correct manner.

SUMMARY OF THE INVENTION

It is an object of the present invention to provide an improved optical pickup feed device capable of moving an optical pickup at a high speed but in a stabilized correct manner, so as to solve the above-mentioned problems peculiar to the above-mentioned prior arts.

According to the present invention, there is provided an optical pickup feed device for feeding an optical pickup in a radial direction of an optical disc, said device including: guiding means enabling the optical pickup to move in a predetermined radial direction of an optical disc; a driving system for producing a driving force to the optical pickup.

The driving system comprises: a feed screw arranged in parallel with a direction in which the optical pickup moves, and is rotatable by a driving force from a driving motor; a nut engaging on the feed screw for moving the optical pickup, said nut including an engaging portion engageable with the feed screw and a bank portion provided on either side of the engaging portion, said bank portion being protruding toward the feed screw.

According to one aspect of the present invention, each bank portion is formed so as to be closer to the feed screw than any valley portion formed between two teeth of the nut.

According to another aspect of the present invention, each bank portion is closer to the feed screw than any valley portion formed between two teeth of the nut, and has a height not in contact with any tooth of the feed screw.

According to a further aspect of the present invention, each bank portion has a width which is larger than a tooth pitch of the feed screw.

According to a still further aspect of the present invention, each bank portion is formed integrally with the nut.

The above objects and features of the present invention will become better understood from the following description with reference to the accompanying drawings.

DETAILED DESCRIPTION OF THE PREFERRED EMBODIMENTS

Figure 4:
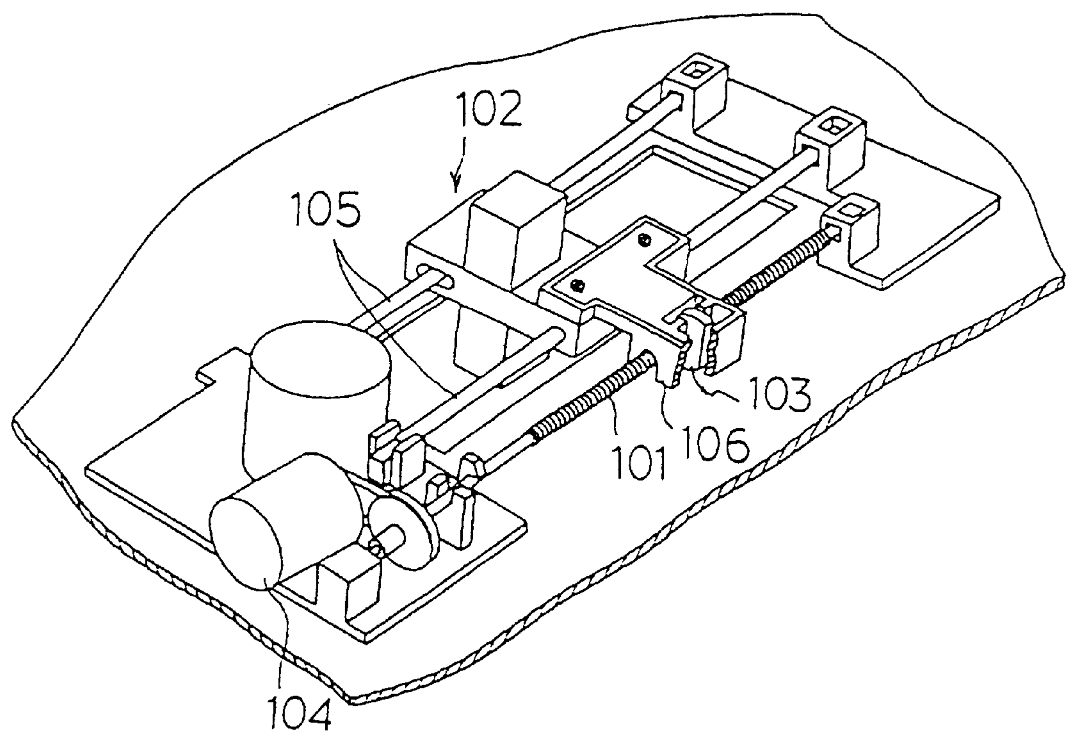
FIG. 4 is a perspective view illustrating an optical pickup feed device made according to a prior art.
Figure 5:
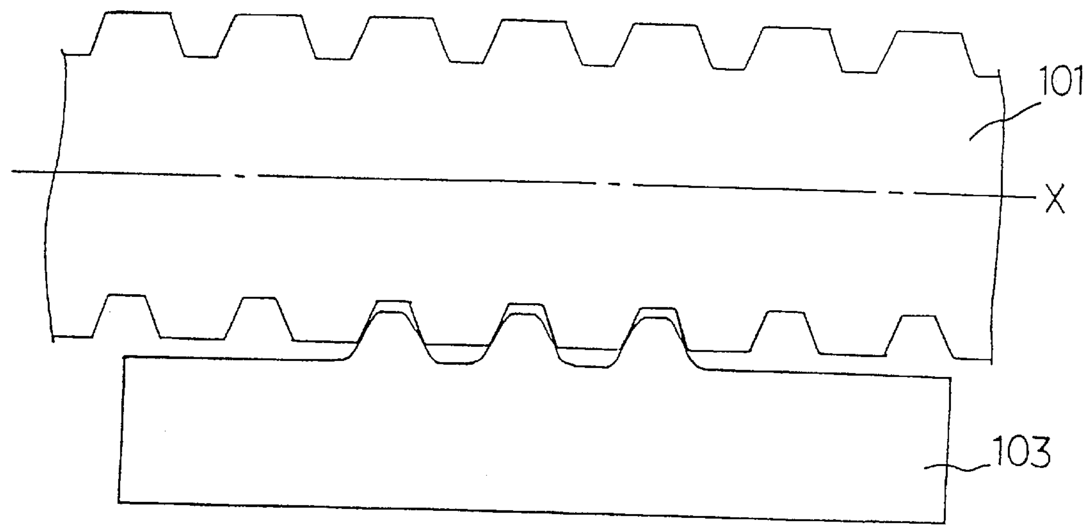
FIG. 5A is a sectional view in side elevation schematically illustrating an engagement between a feed screw and a nut of the optical pickup feed device of FIG. 4.
FIG. 5B is a sectional view in side elevation schematically illustrating an engagement between a feed screw and a nut of the optical pickup feed device of FIG. 4, in a condition when the feed screw is rotated at a high speed about the central axis X, driven by a driving force from a driving motor.
Figure 5:
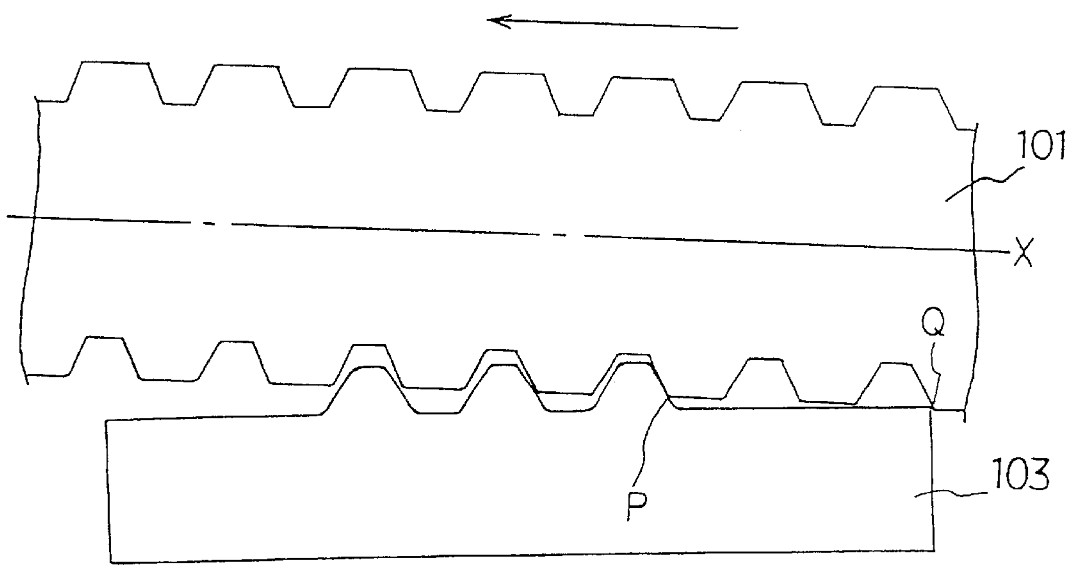

An embodiment of the present invention will be described with reference to FIGS. 1–3, in which the same elements as those in FIGS. 4 and 5 will be represented by the same reference numerals.

Figure 1:
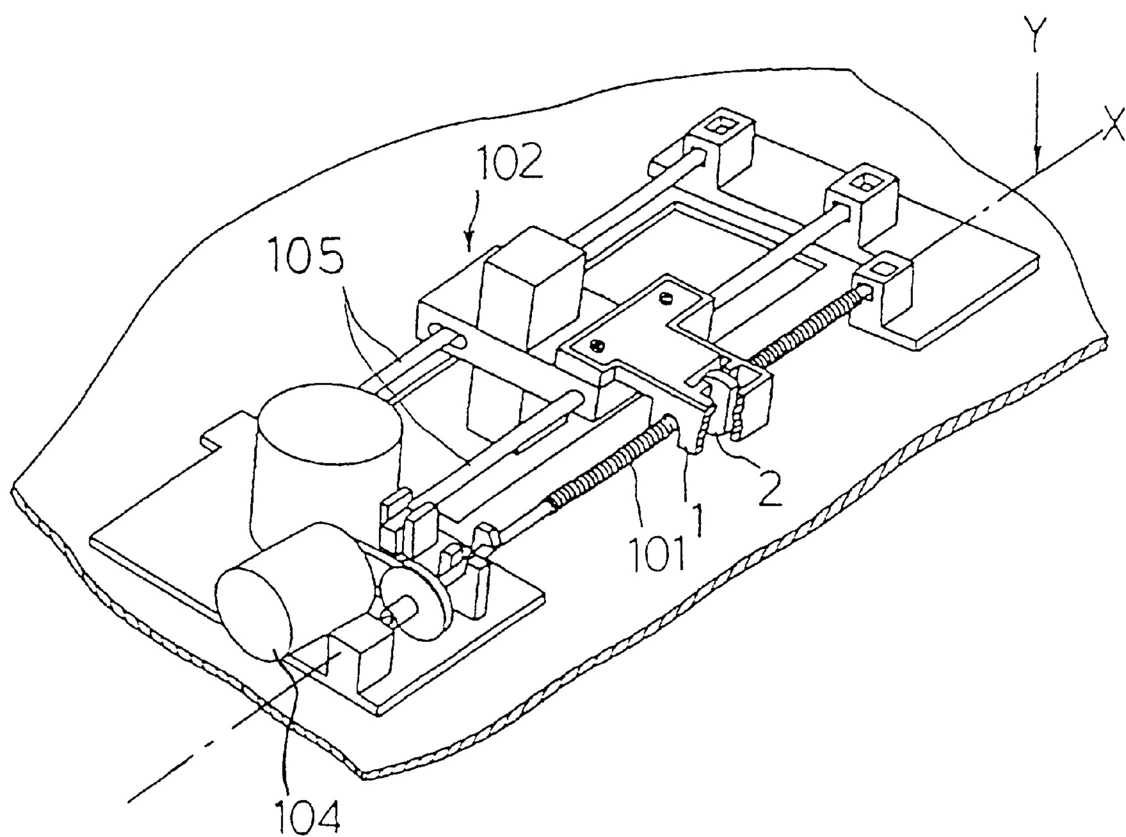
FIG. 1 is a perspective view illustrating an optical pickup feed device made according to an embodiment of the present invention.

Referring to FIG. 1, the optical pickup feed device of the present invention, similar to a conventional feed device, comprises a driving motor 104, a feed screw 101, a nut 2 fixed in a rack 1 which is integrally connected with an optical pickup 102. The optical pickup 102 is slidably mounted on a pair of guide rods 105 arranged in a radial direction of an optical disc.

In detail, the nut 2 is engaged on the feed screw 101. The feed screw 101 may be rotated by a driving force from the driving motor 104, so that the nut 3 is caused to move along the feed screw 101, thereby rendering the rack 1 and the optical pickup 102 to move integrally and linearly along the guide rods 105.

Figure 2:
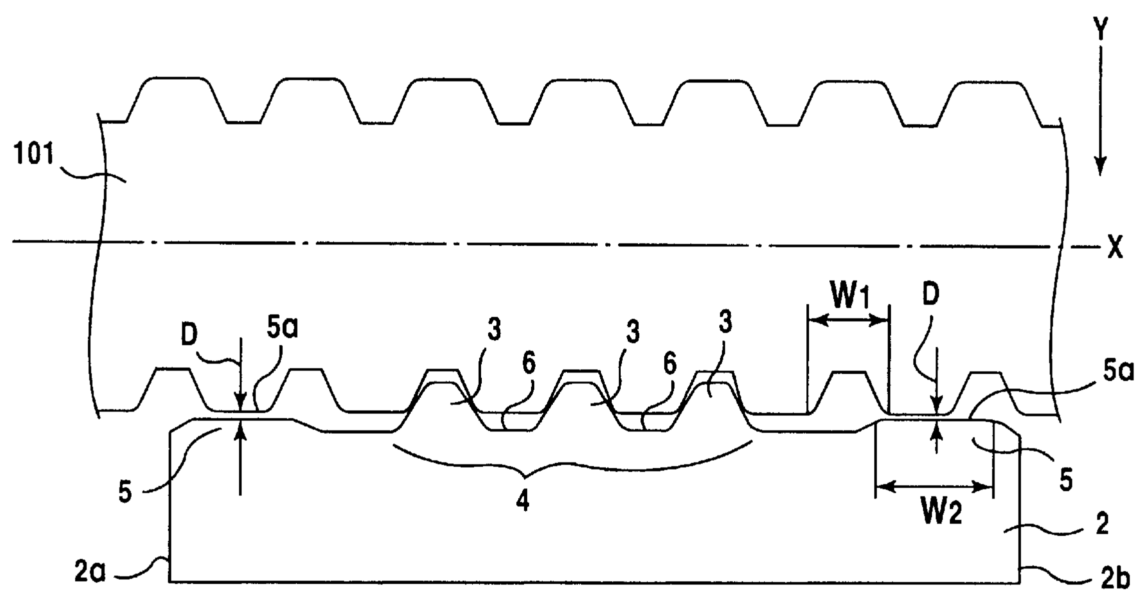
FIG. 2 is a sectional view in side elevation schematically illustrating an engagement between a feed screw and a nut.

FIG. 2 is a sectional view in side elevation schematically illustrating an engagement between the feed screw 101 and the nut 2. As shown in FIG. 2, the nut 2 has an engaging portion 4 including a plurality of teeth 3. The teeth 3 are arranged at an interval corresponding to a tooth pitch of the feed screw 101, so that the teeth 3 of the nut 2 are engageable with the feed screw 101.

Each of the teeth 3 is formed into a screw thread having a predetermined height. The nut 2, having a structure shown in FIG. 2, is adapted to be pressed by a resilient member (not shown) provided on the rack 1, so as to be urged in a direction perpendicular to the central axis X of the feed screw 101. In this way, inclined portions of the teeth 3 of the nut 2 will come into contact with the teeth of the feed screw 101 at positions adjacent to the tops thereof, thereby permitting a proper engagement between the teeth 3 of the nut 2 and the teeth of the feed screw 101.

Further, on either side of the engaging portion 4 there is formed a bank portion 5 which is slightly protruding toward the feed screw 101. In detail, each bank portion 5 has a height which is higher than valley portions 6 between teeth 3 of the nut 2. As shown in FIG. 2, when the teeth 3 of the nut 2 are in engagement with the teeth of the feed screw 101, the bank portions 5 will not get into contact with the teeth of the feed screw 101. Namely, each bank portion 5 has a height (measured from the level of valley portions 6) that is lower than the top of each tooth 3 of the nut 2.

In more detail, each bank portion 5 has a flat top portion 5*a* which will get close to the teeth of the feed screw 101 when the nut 2 is engaged on the feed screw 101. In particular, when the nut 2 is in engagement with the feed screw 101, each bank portion 5*a* will be parallel with the central axis X of the feed screw 101, and an extremely small annular clearance D is formed between the bank portion 5*a* and the teeth of the feed screw 101.

Here, the top portion 5*a* of each bank portion 5 has a width W2 that is larger than a pitch width W1 of teeth of the feed screw 101.

With the optical pickup feed device constructed in the above manner, when the optical pickup is standing still, the nut 3 will be engaged on the feed screw 101, with side walls 2*a*, 2*b* being kept perpendicular to the central axis X.

Figure 3:
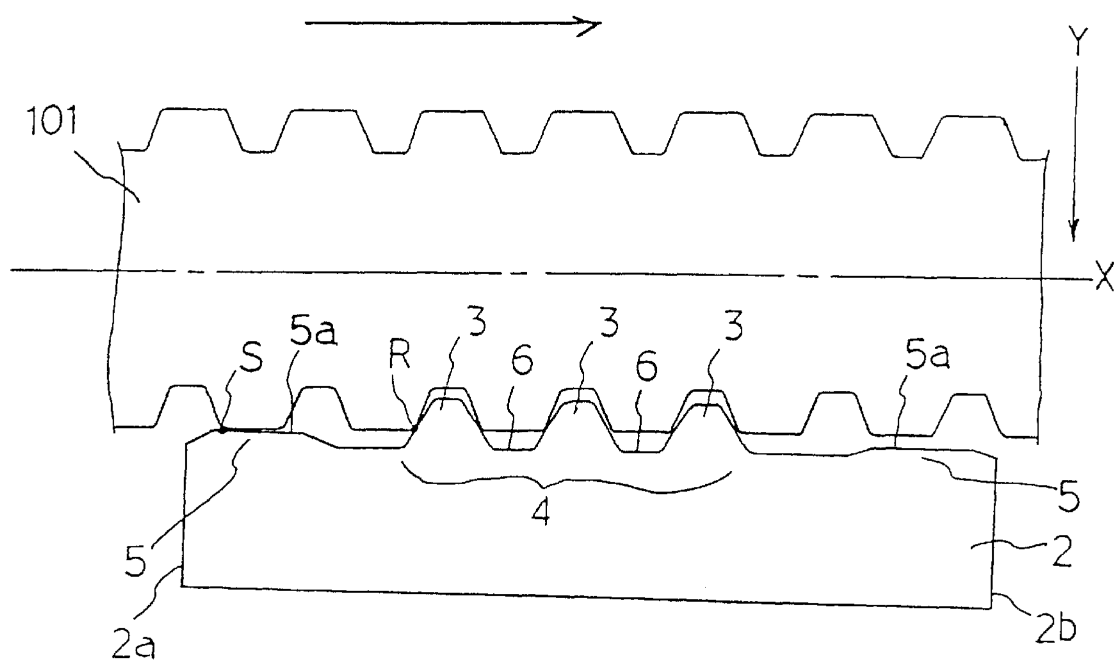
FIG. 3 is a sectional view in side elevation schematically illustrating an engagement between a feed screw and a nut, in a condition when the feed screw is rotated at a high speed about the central axis X, driven by a driving force from a driving motor.

Referring now to FIG. 3, when the feed screw 101 is rotated at a high speed by a driving force from the driving motor 104, the teeth of the feed screw 101 will proceed at a high speed in a direction shown by an arrow in FIG. 3. At this time, the inclined portion of one tooth 3 of the nut 2 will be strongly pressed in the above proceeding direction by one tooth of the feed screw 101, so that the nut 3 as a whole tends to rotate about a contact point R (between the tooth 3 of the nut 2 and said one tooth of the feed screw 101) in a plane of the paper of FIG. 3.

However, since there is only an extremely small clearance D between the top portion 5*a* of each bank portion 5 and the teeth of the feed screw 101, the top portion 5*a* of one bank portion 5 (on the left side in FIG. 3) will soon engage one tooth of the feed screw 101 (at a contact point S) with almost no rotation in the plane of the paper. In this way, it is sure to prevent a possible inclination of the nut 2, ensuring that the side surfaces 2*a* and 2*b* will hardly become inclined from a position which is perpendicular to the central axis X of the feed screw 101.

Further, since the top portion 5*a* of each bank portion 5 has a width W2 that is larger than a pitch width W1 of the teeth of the feed screw 101, said top portion 5*a* will be prevented from getting into a valley between two teeth of the feed screw 101.

In this manner, during the proceeding of the teeth of the feed screw 101, even if a portion other than engaging portion 4 of the nut 2 gets in contact with the feed screw 1, since the top portion 5*a* of the bank portion 5 of the nut 2 will get in contact with the top of a tooth of the feed screw 101, the nut 2 will rotate only in a range of the clearance D with respect to the feed screw 101, thereby ensuring that the side surfaces 2*a* and 2*b* will hardly become inclined from a position which is perpendicular to the central axis X of the feed screw 101. Thus, a side surface 2*a* or 2*b* may be pressed against the rack 1 in a stabilized manner, so as to ensure a desired movement of the optical pickup at a high speed but in a correct and stabilized manner.

Moreover, during the proceeding of the teeth of the feed screw 101, since an edge portion of the nut 2 will not get into a valley between two teeth of the feed screw 102, it will not bump into an inclined portion of a tooth of the feed screw 101, thereby there is not any possibility of increasing a load on the engagement between the nut 2 and the feed screw 101. Thus, the feed screw 101 may be driven in a stabilized manner by a driving force from the driving motor 104, so as to enable the optical pickup 102 to move at a height speed but in a stable manner.

As may be best understood from the above description, with the use of the present invention, when the feed screw 101 is rotated by a driving force from the driving motor 104 and the nut 2 is caused to move in the optical pickup 102's moving direction, an external vibration received by the nut 2 will not cause the nut 2 to become greatly inclined due to a fact that either of the bank portion 5 of the nut 2 will engage the top portion of a tooth of the feed screw 101. Therefore, the side surfaces 2*a* and 2*b* will hardly become inclined from a position which is perpendicular to the central axis X of the feed screw 101, so as to ensure a desired movement of the optical pickup 102 at a high speed but in a correct and stabilized manner.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical pickup feed device for feeding an optical pickup in a radial direction of an optical disc, said device including:

guiding means enabling the optical pickup to move in a predetermined radial direction of an optical disc;

a driving system for producing a driving force to the optical pickup;

wherein the driving system comprising:

a feed screw arranged in parallel with a direction in which the optical pickup moves, and is rotatable by a driving force from a driving motor;

a nut engaging on the feed screw for moving the optical pickup, said nut including an engaging portion engageable with the feed screw and a bank portion provided on either side of the engaging portion;

wherein each bank portion has a top portion so formed that when the nut is engaged on the feed screw, each top portion gets closer to the teeth of the feed screw than any valley portion formed between every two teeth of the nut, so that there is only a small annular clearance formed between the bank portions and the teeth of the feed screw without hampering the rotation of both the feed screw and the nut.

2. The optical pickup feed device according to claim 1, wherein each bank portion is located at a distance from the engaging portion on the nut.

3. The optical pickup feed device according to claim 1, wherein each bank portion is closer to the feed screw than any valley portion formed between two teeth of the nut, and has a height not in contact with any tooth of the feed screw.

4. The optical pickup feed device according to claim 1, wherein each bank portion has a width which is larger than a tooth pitch of the feed screw.

5. The optical pickup feed device according to claim 1, wherein each bank portion is formed integrally with the nut.

* * * * *